June 6, 1972 D. SCARAMUCCI 3,667,725
UNSTRESSED SEATS FOR BETWEEN FLANGE VALVES
Filed Aug. 7, 1968
Fig. 1
Fig. 2 Fig. 3 Fig. 4
INVENTOR.
DOMER SCARAMUCCI
BY
Dunlap, Laney & Hessin
ATTORNEYS United States Patent Office 3,667,725
Patented June 6, 1972

3,667,725
UNSTRESSED SEATS FOR BETWEEN FLANGE VALVES
Domer Scaramucci, Oklahoma City, Okla., assignor to Balon Corporation, Oklahoma City, Okla.
Continuation-in-part of application Ser. No. 526,936, Jan. 3, 1966, now Patent No. 3,428,292. This appplication Aug. 7, 1968, Ser. No. 750,873
Int. Cl. F16k 5/06

U.S. Cl. 251—151 7 Claims

ABSTRACT OF THE DISCLOSURE

An improved valve wherein a sealing ring is disposed in a counterbore in the valve body and maintains sealing engagement between the connecting means which holds the valve in assembled relationship, and the valve body. The sealing ring is also in engagement with a valve seat, such that the sealing ring, deformed by the connecting means, biases the seat toward the valve member, thereby establishing the initial engagement between the seat and the valve member.

CROSS REFERENCES TO RELATED APPLICATION

This is a continuation-in-part of co-pending application, Ser. No. 526,936, filed Jan. 3, 1966 of the same title, now Pat. No. 3,428,292.

BACKGROUND OF THE INVENTION

(1) Field of the invention

This invention relates generally to improved valves. More particularly, but not by way of limitation, this invention relates to improved seats for use in between flange valves.

(2) Description of prior art

Previously constructed ball valves for use between flanges generally include a valve body having a passageway extending therethrough, a valve member movably positioned in the passageway, and at least one annular seal member disposed in the passageway and having a surface thereon arranged to sealingly engage the valve member. The flanges are disposed at each end of the valve body and are connected therewith by a plurality of threaded bolts that extend between the flanges.

Frequently, an annular metal ring having one surface in engagement with the annular seal member and the other end in engagement with the flange adjacent the seal member is used to confine the annular seal member to prevent extension of the seal under the influence of pressure in the valve. As the bolts are tightened to hold the valve assembled, the metal ring forces the seal into engagement with the valve member. The inward movement of the metal ring, as the flanges are tightened during assembly with the valve body, often distorts the seal members to such an extent that the seal members are permanently deformed and, therefore, will not form an effective seal with the valve member. Sometimes the force exerted on the valve member is so large that the valve member is extremely difficult to move between the open and closed positions in the valve body.

SUMMARY OF THE INVENTION

Generally, this invention contemplates a valve, comprising; a body having upstream and downstream end faces and a bore extending therethrough intersecting said end faces forming a valve chamber for the valve, the body having a counterbore at each end. A pipe flange is provided at each end of the valve body and is held in assembled relation with the body by holding means. A valve member is supported in the valve chamber for upstream and downstream movement when in a closed position. A valve seat is disposed in each end of the valve chamber. Each of the seats comprises a relatively rigid supporting ring of a size to slidingly fit in said bore, having an inner end and an outer end. A radially inwardly extending flange portion is formed on the outer end and a radially outwardly extending flange portion is also formed on the outer end, extending into the respective counterbore. The radially outwardly extending flange portion has an outer diameter less than the diameter of the respective counterbore. A sealing material is bonded to the supporting ring and the radially inwardly extending flange portion and has a surface thereon shaped to mate with the valve member. A sealing ring is wedged between the outer periphery of each of the radially outwardly extending flange portions and the walls of the respective counterbore. The sealing ring biases the respective supporting ring and sealing material toward the valve member. Each of the sealing rings is sized to sealingly engage the respective pipe flange and provide a seal between the valve body and the respective pipe flange, as well as between the valve body and the respective radially outwardly extending flange portion.

One object of the invention is to provide an improved valve for use between connecting members that provides for the initial sealing engagement between the seal member and valve member without distorting the seal member.

Another object of the invention is to provide an improved valve for use between connecting members that provides a fluid-tight seal between the valve body and the adjacent connecting member.

One other object of the invention is to provide an improved valve for use between connecting members that is constructed to provide sufficient initial engagement between the seal and valve member to initiate a fluid-tight seal, but that avoids the exertion of undue force on the seal and valve member.

Still another object of the invention is to provide an improved valve for use between connecting members that provides for the initial sealing engagement between the seal and valve member, forms a fluid tight seal between the valve body and connection member, and yet avoids the exertion of undue force on the valve member.

The foregoing and additional objects and advantages of the invention will become more apparent as the following detailed description is read in conjunction with the accompanying drawings wherein like reference characters denote like parts in all views.

DESCRIPTION OF THE PREFERRED EMBODIMENT

Figures 1, 2, 3, 4:
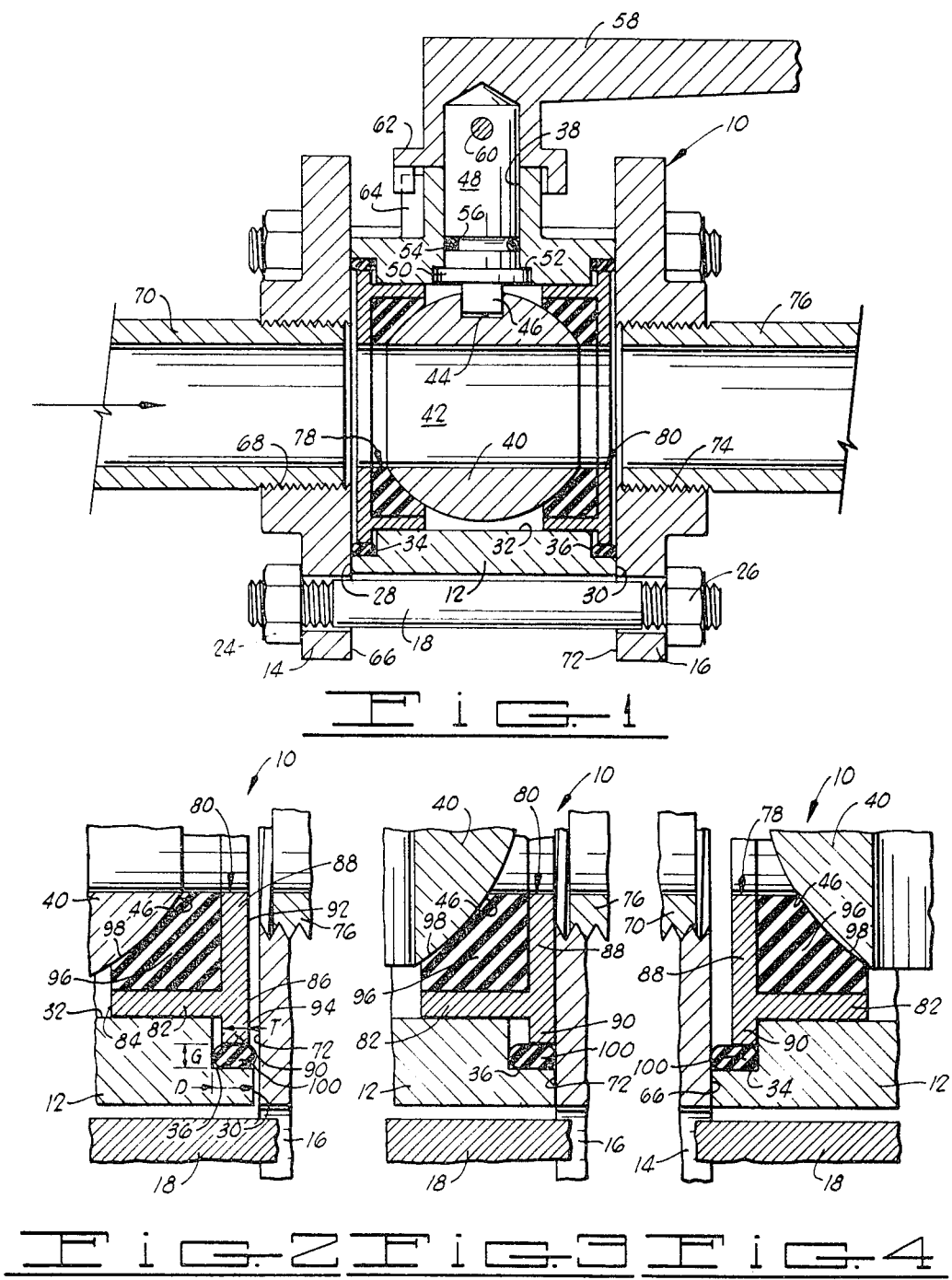
FIG. 1 is a vertical cross-sectional view of a ball valve constructed in accordance with the invention.
FIG. 2 is an enlarged, fragmentary cross-sectional view illustrating the structure of the seat of the ball valve of FIG. 1.
FIG. 3 is an enlarged, fragmentary cross-sectional view similar to FIG. 2, but illustrating the downstreams seat in the assembled condition with the valve member moved to the closed position.
FIG. 4 is an enlarged, fragmentary cross-sectional view similar to FIG. 2, but illustrating the upstream seat.

Referring to the drawings, and to FIG. 1 in particular, shown therein and generally designated by the reference character 10 is a ball valve constructed in accordance with the invention. The ball valve 10 includes a valve body 12 and flanges 14 and 16. The valve body 12 and flanges 14 and 16 are held assembled by a plurality of threaded bolts 18 that extend through flanges 14 and 16. Each of the bolts 18 is provided with a pair of threaded nuts 24 and 26 that engage, respectively, the flanges 14 and 16.

The valve body 12 includes an upstream end face 28, a downstream end face 30 and a bore 32 extending therethrough intersecting the upstream and downstream end faces 28 and 30 to form the valve chamber of the valve. Counterbores 34 and 36 are formed in the valve body 12 adjacent the end faces 28 and 30, respectively. An aperture 38 extends transversely through the valve body 12 intersecting the bore 32 for purposes that will become more apparent hereinafter.

A spherical valve member, that is, a valve ball 40, is movably disposed in the bore 32 of the valve body 12. The valve ball 40 has a port 42 extending therethrough and has a rectangular recess 44 formed in the exterior surface thereof. The exterior recess 44 is sized to receive a rectangular end 46 formed on the lowermost end portion of a valve stem 48. The recess 44 is longer than the end 46 to permit movement of the valve ball 40 in a direction parallel to the bore 32 when the valve ball 40 is in the closed position.

The valve stem 48 extends through the transversely extending aperture 38. In addition to the rectangular end 46, the valve stem 48 includes an exterior flange 50 that engages a downwardly facing surface 52 in the valve body 12 encircling the aperture 38 to limit the upward movement of the valve stem 48 in the aperture 38. An O-ring seal 54 is disposed in an annular recess 56 formed in the valve stem 48 and is arranged to provide a fluid tight seal between the valve body 12 and the valve stem 48 in the aperture 38.

A handle 58 is connected with the upper end of the valve stem 48 by a pin 60. The handle 58 includes a lug portion 62 that is engageable with a pair of abutments 64 (only one is shown in FIG. 1) to limit the rotational movement of the handle 58 and the interconnected valve ball 40 to approximately 90 degrees.

The flange 14 also includes an end face 66 and a threaded opening 68 that extends therethrough. The threaded opening 68 is sized and arranged to receive the threaded end of a conduit 70. The opening 68 is, as shown in FIG. 1, axially aligned with the bore 32 extending through the valve body 12.

The flange 16 includes an end face 72 and a threaded opening 74 that extends therethrough. The threaded opening 74 is sized and arranged to receive the threaded end of a conduit 76. The opening 74 is also axially aligned with the bore 32.

The bore 32 and the counterbores 34 and 36 of valve body 12 are provided to receive and cooperate with the upstream and downstream seat assemblies generally designated by the reference characters 78 and 80, respectively. In a preferred form, the seat assemblies 78 and 80 are of identical construction, so it will be necessary only to describe one such seat assembly in detail, it being understood that like reference characters apply to like parts in either the upstream or downstream seat assembly 78 or 80, respectively.

A preferred downstream seat assembly 80 construction is illustrated in FIG. 2 in its relaxed or unstressed condition, that is, the nuts 24 and 26 have not been tightened on the bolts 18 to the extent that the flange 16 is tightly assembled with the valve body 12.

As clearly shown in FIG. 2, the seat assembly 80 includes a relatively rigid supporting ring 82 having an outer periphery sized to provide a sliding fit in the bore 32 of valve body 12. The ring 82 includes a valve member end 84 and a non-valve member end 86. The non-valve member end 86 of ring 82 is normal to the axis of valve 10 to abut end face 72 of flange 16.

A radially inwardly extending flange portion 88 is formed on the ring 82 adjacent the non-valve end 86 thereof. A radially outwardly extending flange portion 90; having a thickness T is also formed on the ring 82 adjacent the non-valve member end 86 thereof. It may be observed in FIG. 2 that the non valve member ends 92 and 94 of flange portions 88 and 90 respectively, are coplanar with the non valve member end 86 of ring 82 and are also shaped to abut the end face 72 of flange 16. The thickness T of flange portion 90 is provided to be less than or equal to the depth D of counterbore 36 of valve body 12 for purposes that will become more apparent hereinafter.

It may be observed in FIG. 2 that the flange portion 90 of ring 82 extends radially outwardly and is disposed in a portion of counterbore 36 of valve body 12. The outer periphery or outer diameter of flange portion 90 of ring 82 is less than the diameter of counterbore 36 of valve body 12, creating a gap G between the flange portion 90 of ring 82 and the counterbore 36 of valve body 12 when the seat assembly 80 is in the position shown in FIG. 2.

A sealing material 96 is bonded to the ring 82 and the flange portion 88 of ring 82. The sealing material 96 has a valve member end surface 98 thereon configured to sealingly engage the exterior surface of the valve member 40. In a preferred form of the invention, the seal material 96 is constructed from a resilient material that is compatible with the fluid flowing through the valve 10, such as natural or synthetic rubber, or one of the resilient synthetic resins.

A sealing ring 100 is wedged in the area defined by the gap "G" between the flange portion 90 of ring 82 and counterbore 36 of valve body 12. The ring 100 is preferably an O-ring and the cross sectional diameter of the sealing ring 100 is sized to be larger than either the depth D of counterbore 36, or the gap G for reasons which will become more apparent hereinafter.

With the valve 10 assembled as illustrated in FIG. 1, that is, with the valve ball 40, rotated to the position wherein the port 42 extending therethrough is aligned with the bore 32 in the valve body 12, fluid will flow through the valve 10.

Since the cross sectional diameter of the sealing ring 100 exceeds the depth D of the counterbore 36 of valve body 12, the sealing ring 100 will be deformed when the nuts 24 and 26 are tightened on bolts 18 to securely assemble the upstream and downstream flanges 14 and 16 with the valve body 12. This deformation of the sealing rings 100 will result in a fluid tight seal being formed between the respective end faces 66 and 72 of flanges 14 and 16, respectively, and the valve body 12 of valve 10.

It is apparent from the foregoing and from FIG. 2 that a fluid tight seal will also be formed by the sealing rings 100 between the seat assemblies 78 and 80 and the valve body 12 of valve 10.

As previously discussed, the cross-sectional diameter of each sealing ring 100 also exceeds the respective gap G, therefore, when the sealing rings 100 are deformed, an initial biasing force will be exerted on the seat assemblies 78 and 80 in a resultant direction generally toward the center of the valve member 40 of valve 10. The biasing of the seat assemblies 78 and 80 generally toward the valve member 40 of valve 10 provides an initial sealing engagement between the surface 98 of sealing material 96 and the surface 46 of valve member 40.

Fluid pressure, for example, in the conduit 70 on the upstream side of the valve 10, exerts a force on the valve member 40, moving the valve member 40 relatively downstream by virtue of the loose connection between the valve stem 48 and the valve member 40 to the position illustrated in FIGS. 3 and 4. As clearly shown in FIG 3, the movement of the valve member 40 downstream with the exterior surface 46 thereof in engageemnt with the surface 98 of seat assembly 80, moves the seat assembly 80 in a direction generally toward the end surface 72 of flange 16. Thereby further deforming the sealing ring 100.

It may be observed in FIG. 3 that a fluid-tight seal is effected between the surface 98 of seat 80 and the exterior surface 46 of valve member 40, and between seat assembly 80 and the valve body 12 of valve 10. Manifestly, no fluid can escape from the valve 10 between the valve body 12 and flange 16 due to the sealing ring 100 disposed therebetween.

It should also be pointed out that the provision of the sealing rings 100 in conjunction with the movable seat assemblies 78 and 80, permits the reduction of required tolerances for constructing the valve 10, since the resiliency of the material forming the sealing rings 100 permits the deformation thereof to compensate for minor deviations from the required tolerances. Furthermore, it can be clearly observed in FIGS. 1 and 3, that the initial seal formed upon assembling of the valve 10 will not distort the seat assemblies 78 or 80. Since a relatively small amount of deformation takes place in actual practice, the biasing force exerted by the sealing rings 100 on seat assemblies 78 and 80 is not of sufficient magnitude to distort or deform the seat assemblies 78 and 80. Thus, a valve 10 constructed in accordance with the invention avoids the imposition of distorting forces on the seat assemblies 78 and 80.

The seat assembly 78 will function in a manner similar to that described with respect to the seat assembly 80. The main difference in the operation of the two assemblies 78 and 80, when fluid pressure exists in conduit 70 on the upstream side of valve 10, is that this pressure exerted on the seat assembly 78 will cause the seat asembly 78 to move in the downstream direction following the movement of valve member 40 of valve 10, previously described. This movement in the downstream direction is limited by the flange portion 90 of seat assembly 78 cooperating with the shoulder formed by counterbore 36 of valve body 12. The limitation on the downstream movement of seat assembly 78 will eliminate the problem caused by the upstream seat assembly 78 binding against the valve member 40 of valve 10, thereby requiring less torque to rotate the valve member 40 back to the open position as shown in FIG. 1.

It may be observed in FIG. 4 that the sealing ring 100 will maintain sealing contact between the valve body 12 of valve 10 and the end face 66 of flange 14. Of course, in the position shown in FIG. 4, the sealing ring 100 will also exert a biasing force on the seat assembly 78 tending to maintain contact between the surface 98 of seat assembly 78 and the valve member 40.

One of the primary objects in constructing ball valves for use between flanged connecting members has been to reduce the overall length of the valve structure while maintaining the maximum size of flow port 42 through the valve ball 40. When reinforcing structures are used with the seals, the radially inwardly extending flange portion, such as the flange portion 88 in FIG. 2, must be kept to a minimum thickness "T"; otherwise, the valve body will be too long, requiring exceptionally long fasteners 18. Manifestly, if the thickness "T" is very small, the seat structures can be easily deformed when the threaded fasteners 18 are tightened.

The valve of FIG. 1 constructed in accordance with this invention, provides a means of reducing or limiting the deforming forces exerted on the seat assemblies and, yet, provides some biasing force to initiate sealing engagement between the seat assemblies and the valve member. Therefore, valves constructed as described hereinbefore can be of a minimum length with maximum flow area without sacrificing their ability to seal effectively.

Furthermore, it will be understood that the embodiment described in detail hereinbefore is presented by way of example only and that many changes and modifications can be made thereto without departing from the spirit of the invention or from the scope of the annexed claims.

What I claim is:
1. A valve comprising:
a body having upstream and downstream end faces and a bore extending therethrough intersecting said end faces forming a valve chamber for the valve, said body having a counterbore at each end of said bore;
a flange at each end of the valve body;
means holding the flanges in assembled relation with the body;
a valve member supported in the valve chamber for upstream and downstream movement when in a closed position;
an annular valve seat in each end of the valve chamber, each of said seats comprising: a relatively rigid supporting ring of a size to slidingly fit in said bore having a valve member end and a non-valve member end, a radially inwardly extending flange portion formed on the non-valve member end thereof forming, with the ring, an L-shape, and a radially outwardly extending flange portion formed on the non-valve member and of the ring extending into the respective counterbore, said radially outwardly extending flange portion having an outer diameter less than the diameter of the respective counterbore; thereby providing a gap between the radially outwardly extending flange portion and the counterbore; and
sealing material bonded to the supporting ring and the radially inwardly extending flange portion shaped to mate with the valve member; and
a sealing ring wedged between the outer periphery of each said radially outwardly extending flange portions and the walls of the respective counterbore biasing the respective supporting ring and sealing material toward the valve member, each of said sealing rings being of a size to sealingly engage the respective flange and provide a seal between the valve body and the respective flange, as well as between the valve body and the respective radially outwardly extending flange portion.

2. A valve as defined in claim 1 wherein each of said sealing rings is of circular cross section in its relaxed condition.

3. The valve of claim 2 wherein each sealing ring has a cross sectional diameter greater than the depth of the respective counterbore.

4. The valve of claim 3 wherein the cross sectional diameter of each sealing ring is greater than the gap between the respective radially outwardly extending flange portion and the respective counterbore.

5. A valve as defined in claim 1 wherein the valve member is a ball.

6. A valve as defined in claim 1 wherein the ends of said radially inwardly and outwardly extending flange portions of each supporting ring facing the respective flange are coterminous and the thickness of each of said radially outwardly extending flange portions is substantially equal to the depth of the respective counterbore.

7. A valve as defined in claim 1 wherein the ends of said radially inwardly and outwardly extending flange portions of each supporting ring facing the respective flange are coterminous and the thickness of each of said radially outwardly extending flange portions is less than the depth of the respective counterbore.

References Cited
UNITED STATES PATENTS

| | | | |
|---|---|---|---|
| 3,367,624 | 2/1968 | Scaramucci | 251—148 |
| 3,371,907 | 3/1968 | Scaramucci | 251—315 X |
| 3,373,967 | 3/1968 | Scaramucci | 251—315 X |
| 3,373,968 | 3/1968 | Scaramucci | 251—315 X |

WILLIAM R. CLINE, Primary Examiner

U.S. Cl. X.R.

137—315